United States Patent
Ugrewicz (10) Patent No.: US 9,420,828 B2
(45) Date of Patent: Aug. 23, 2016

(54) VALVE DEVICE FOR CHANGING OVER THE MASS FLOW OF ROD-LIKE ARTICLES IN CONVEYING CHANNELS OF THE TOBACCO INDUSTRY

(71) Applicant: International Tobacco Machinery Poland Sp. z o. o., Radom (PL)

(72) Inventor: Grzegorz Ugrewicz, Radom (PL)

(73) Assignee: International Tobacco Machinery Poland sp. z o.o., Radom (PL)

( * ) Notice: Subject to any disclaimer, the term of this patent is extended or adjusted under 35 U.S.C. 154(b) by 0 days.

(21) Appl. No.: 14/711,470

(22) Filed: May 13, 2015

(65) Prior Publication Data

US 2015/0342247 A1   Dec. 3, 2015

(30) Foreign Application Priority Data

May 28, 2014   (PL) ........................................ 408357

(51) Int. Cl.
*B65G 1/00*   (2006.01)
*A24C 5/35*   (2006.01)
(Continued)

(52) U.S. Cl.
CPC . *A24C 5/35* (2013.01); *B65G 37/00* (2013.01); *B65G 47/647* (2013.01)

(58) Field of Classification Search
CPC ........ B65G 1/00; B65G 3/04; B65G 2201/06; B65G 47/8823
USPC ......... 198/347.1, 442, 457.03, 457.06, 459.6, 198/530, 531, 451
See application file for complete search history.

(56) References Cited

U.S. PATENT DOCUMENTS 4,042,094 A * 8/1977 Schmermund ........... A24C 5/35
                                                                131/282
4,125,184 A   11/1978 Seragnoli
(Continued)

FOREIGN PATENT DOCUMENTS

EP   1989945 A1   11/2008
WO   02096227 A2   12/2002
(Continued)

OTHER PUBLICATIONS

European Search Report, Application No. EP15165101; Search Completed Jul. 9, 2015.
(Continued)

*Primary Examiner* — James R Bidwell
(74) *Attorney, Agent, or Firm* — Oppedahl Patent Law Firm LLC (57) ABSTRACT

A valve device for changing over the mass flow of rod-like articles of the tobacco industry, between at least two non-parallel conveying channels feeding the rod-like articles and a conveying channel receiving the rod-like articles or between a conveying channel feeding the rod-like articles and at least two non-parallel conveying channels receiving the rod-like articles, comprising at least one rotatable element changing over the mass flow comprising a through channel for the transfer of the mass flow between the feeding conveying channel and the receiving conveying channel, with the rotatable change-over element having different angular positions relative to its principally horizontal axis of rotation which allow connecting individual feeding and receiving channels, characterized in that in the rotatable change-over element (4) at least one conveying unit (5) situated at the wall (7a, 7b, 7c, 7d) of a through channel (7) of the rotatable change-over element (4) is disposed, with the conveying unit (5) having an operating section (8a, 8b, 8c, 8d) supporting the mass flow of the rod-like articles (E) via the through channel (7) in the direction from the feeding channel (2, 2a, 2b) to the receiving channel (3, 3a).

12 Claims, 5 Drawing Sheets (51) Int. Cl.
*B65G 37/00* (2006.01)
*B65G 47/64* (2006.01)

(56) References Cited

U.S. PATENT DOCUMENTS

| | | | |
|---|---|---|---|
| 5,217,101 A | 6/1993 | Raschka | |
| 5,529,164 A * | 6/1996 | Meinke | A24C 5/35 198/347.2 |
| 7,044,286 B2 * | 5/2006 | Sikora | B65G 47/766 198/347.1 |
| 8,327,996 B2 * | 12/2012 | Gielniewski | A24C 5/35 198/347.1 |
| 8,809,968 B2 * | 8/2014 | Hilt | H01L 29/78 257/402 |

FOREIGN PATENT DOCUMENTS

| | | |
|---|---|---|
| WO | 2004089122 A2 | 10/2004 |
| WO | 2009139653 A1 | 11/2009 |
| WO | 2011099880 A1 | 8/2011 |
| WO | 2013019131 A1 | 2/2013 |

OTHER PUBLICATIONS

Polish Patent Office Action Search Report, Mailed Sep. 17, 2014. App # 408357.

* cited by examiner

VALVE DEVICE FOR CHANGING OVER THE MASS FLOW OF ROD-LIKE ARTICLES IN CONVEYING CHANNELS OF THE TOBACCO INDUSTRY

BACKGROUND

In the production lines of rod-like articles of the tobacco industry, such as cigarettes, filters or cigarettes with the filter already attached, in the course of the production process said articles cover a considerable distance after leaving the manufacturing machine before they are put into packages in the packaging machine or stored in warehouses. The articles are usually conveyed in a multi-layered ordered stack, which eliminates the deformation or destruction thereof. There is a need of handling the stream of articles for the purpose of delivering them to or from different devices used in the production line, among others in the direction opposite to the action of the gravitational force. For this purpose, on the path of horizontal conveyors transferring the products, channels connecting one horizontal conveyor with another horizontal conveyor or a receiving device are designed. The rod-like articles entirely fill vertical channels and essentially horizontal conveyors, which is a condition determining the preservation of their arrangement. The transfer on a horizontal path is usually forced by the conveyor, just as the upward transfer in angularly situated channels, whereas the downward transfer is usually forced by gravity. The said handling of the flow many times consists in shutting off the channel in which the articles flow or in directing the stream of articles to or from another receiving device, with the necessary condition being that the rod-like articles are to be as little damaged as possible when handling the flow. At the moment of change-over of the direction of flow of a supply channel filled with rod-like articles to the receiving channel, momentary stresses on the product occur at the point of valve change-over, which leads to permanent deformations or damage of the product. Devices for transferring a stream and/or changing over the direction thereof are known in the prior art. The EP 1395135 patent describes a device and a method of separation from one another of multi-layered stacks of rod-like articles at the connection point of conveying channels. The separating element is a cylinder sector which rotates around its axis and directs the mass flow from one channel to another. The channels are stationary and do not change their positions. However, the rotational movement of the valve causes the occurrence of local stresses on rod-like articles in the area of contact of the valve with the channel wall. In this solution, rod-like articles are fed in the horizontal direction and/or downwards. In vertical channels, the movement of the articles is forced by gravity. The WO 2013019131 publication presents a device for controlling the mass flow in the tobacco industry. The flow control of rod-like articles transferred by gravity is accomplished by means of movable plates. At the moment of shutting-off the flow or changing its direction in the region of the contact with the blocking surface, stresses caused by the pressure from above of successive layers of the product and the movement of plates changing the direction are acting on the rod-like articles.

Another substantial problem frequently related to the use of valves to change the direction of mass flow of rod-like articles is the trapping of the product at the channel shut-off points by the shutting-off surface of a movable or rotatable valve element with the channel edge.

SUMMARY OF THE INVENTION

The substance of the invention is a valve device for changing over mass flow of rod-like articles of the tobacco industry, between at least two non-parallel conveying channels feeding rod-like articles and a conveying channel receiving rod-like articles or between a conveying channel feeding rod-like articles and at least two non-parallel conveying channels receiving rod-like articles, comprising at least one rotatable change-over element for changing over mass flow comprising a through channel for transferring mass flow between the feeding conveying channel and the receiving conveying channel, where the rotatable change-over element is designed with different angular positions relative to its principally horizontal axis of rotation which allow connecting individual feeding and receiving channels. A valve according to the invention is characterised in that in the rotatable change-over element at least one conveying unit situated at a wall of the through channel of the rotatable change-over element is disposed, the conveying unit having an operating section supporting the mass flow of rod-like articles via the through channel in the direction from the feeding channel to the receiving channel.

An apparatus according to the invention is characterised in that the rotatable element changing over the mass flow has at least one shut-off surface rotatable together with the through channel for the shutting-off an opening of a channel which is not connected with the through channel of the change-over element.

An apparatus according to the invention is characterised by being provided with a guiding surface for rod-like articles located in the through channel of the change-over element during the rotation of the rotatable change-over element.

An apparatus according to the invention is characterised in that the conveying unit comprises a conveying belt or chain and elements guiding the conveying belt or chain situated at both ends of the operating section of the conveying unit.

An apparatus according to the invention is characterised in that at least one wall of the through channel is formed by the operating section of the conveying unit and by at least one wall element.

An apparatus according to the invention is characterised in that the axis of rotation of the rotatable change-over element is situated within the guiding element or the wall element.

An apparatus according to the invention is characterised in that at least one wall of the through channel is formed entirely by the operating section of the conveying unit.

An apparatus according to the invention is characterised in that the axis of rotation of the rotatable change-over element is situated within the guiding element.

An apparatus according to the invention is characterised in that the walls of the through channel are essentially parallel to each other.

An apparatus according to the invention is characterized in that the pushing away elements for separating the rod-like articles situated in the feeding channel from the rod-like articles situated in the rotatable change-over element are disposed in between the feeding channel and the rotatable change-over element.

An apparatus according to the invention is characterised in that the pushing away elements are compressed air nozzles.

An apparatus according to the invention is characterised in that the pushing away elements are pushing away rollers.

Due to the use of a valve device in the mass flow of rod-like articles in the tobacco industry, we can more effectively change over the flows between feeding and receiving conveying channels, in particular when feeding upwards slantwise or vertically, where pressures on and deformations of rod-like articles caused by change-over elements and by the action of gravitational force are occurring. The occurring disturbances in the mass flow caused by a change in position relative to the direction of flow are usually avoided. The rotatable change-over element of the valve device is provided on its walls of the through channel with a conveying unit whose task is to reduce or completely eliminate pressures on and deformations of rod-like articles, which is tantamount to a reduction of the production waste and an increase in the product quality. The conveying unit, through its operating surface, supports the mass flow by conveying the rod-like articles from the feeding conveying channel via the through channel of the rotatable change-over element to the receiving conveying channel. The conveying unit may be a belt, a chain or another conveying element allowing the conveyance of rod-like articles.

Furthermore, the valve device has shut-off surfaces which during a change-over of the flow shut off or open the flow from feeding or receiving conveying channels so that before a change of position of the rotatable change-over element, and thus during the change of direction of the mass flow of rod-like articles, it is not necessary to remove the rod-like articles from the feeding and receiving conveying channels. This way we save time for successive fillings of the conveying channels. The shut-off surfaces are fastened to the rotatable change-over element with which together they make a rotational motion.

In order to eliminate the jamming of the product by rotatable elements of the valve device, elements pushing away the product from the surroundings of the shut-off area of the feeding or receiving channel were used. The pushing away element may be a rotatable roller, a nozzle feeding compressed air, a pushing hinge or another device pushing away the rod-like articles from the point of contact of the shut-off surface with the channel edge.

BRIEF DESCRIPTION OF THE DRAWING

The invention is presented in detail in an embodiment in a drawing in which.

DETAILED DESCRIPTION

Figure 1:
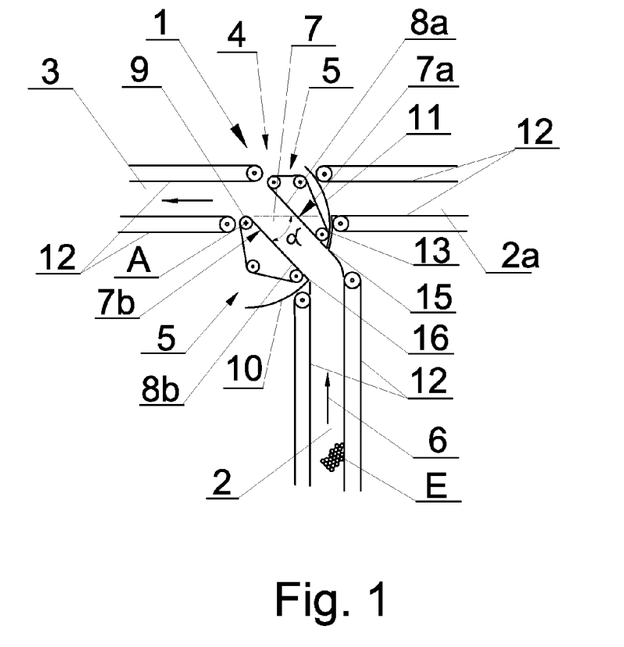
FIG. 1 shows valve devices in a first embodiment in the upward flow position.

FIG. 1 shows, in the first embodiment, a valve device 1 for changing over the mass flow of rod-like articles E of the tobacco industry between two non-parallel conveying channels 2 and 2a feeding the rod-like articles and a conveying channel 3 receiving the rod-like articles. The valve device 1 is provided with a rotatable change-over element 4 in which two conveying units 5 are disposed to support the mass flow of rod-like articles E situated crosswise to the direction of flow 6 via a through channel 7 of the rotatable change-over element 4. In this embodiment, the conveying units 5 are designed as belt or chain units and are situated in such a way that the operating sections 8a, 8b of the conveying units 5 being the operating surfaces of the belts are parallel to each other and at least one of the operating sections 8a, 8b forms a wall 7a, 7b of the through channel 7. The operating section 8a of the conveying unit is understood as a section of the chain or the belt used to form the through channel 7. The operating surface is understood as a portion of the belt or the chain being in contact with guided rod-like articles E. In the first embodiment, the walls 7a, 7b of the channel 7 are formed by the operating sections 8a, 8b and the wall elements 15, 16 on the side of the channel 2, 2a. The rotatable change-over element 4 may comprise one conveying unit 5. Embodiments with a plurality of conveying units 4 arranged opposite to one another and one after another are also possible. The rotatable change-over element 4 rotates around its principally horizontal axis of rotation A which is situated within the guiding element 9 of the belt or the chain in the exit area of the through channel 7 on the side of the receiving conveying channel 3. An anticlockwise rotation by a certain angle α of the rotatable change-over element 4 around its axis of rotation A will cause a shut-off of the flow in the feeding channel 2 by the shut-off surface 10 of the rotatable change-over element 4, thus an opening of the horizontal flow to the receiving channel 3 from the feeding channel 2a via the through channel 7 by lifting the shut-off surface 11 of the rotatable change-over element 4, which has been shown in FIG. 2. During a change of position of the rotatable change-over element 4, the rod-like articles situated in the through channel 7 are guided on the guiding surface 13 up to the exit area of the feeding channel 2a. The guiding surface 13 is situated between the exits of two non-parallel feeding channels. The feeding conveying channels 2, 2a and the receiving conveying channel 3 are provided on their walls with conveyors 12 which allow the movement of rod-like articles in channels situated horizontally, vertically or slantwise.

Figure 2:
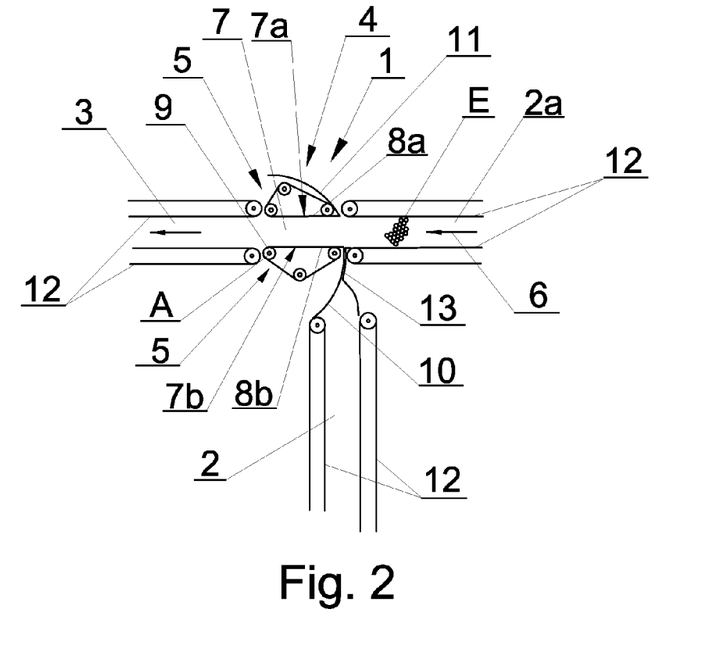
FIG. 2 shows the valve device of FIG. 1 in the flow position from the right feeding to the left receiving channel.

FIG. 2 shows the valve device 1 in the first embodiment in a second position of the rotatable change-over element 4 with two feeding conveying channels 2 and 2a and one receiving conveying channel 3. After an anticlockwise rotation by the angle α around the axis A of the rotatable change-over element 4 from the position shown in FIG. 1, we obtain such configuration of the conveying channels where the mass flow of the rod-like articles takes place in the horizontal direction and is marked with the arrow 6. During the rotational motion of the change-over element 4, the shut-off surface 11 moves upwards and opens the flow between the feeding conveying channel 2a and the receiving conveying channel 3, whereas at the same time the shut-off surface 10 moves upwards and shuts off the flow from below from the feeding conveying channel 2. During the change of position of the rotatable change-over element, the flow of the rod-like articles E in the channel 2 is stopped.

Figure 3:
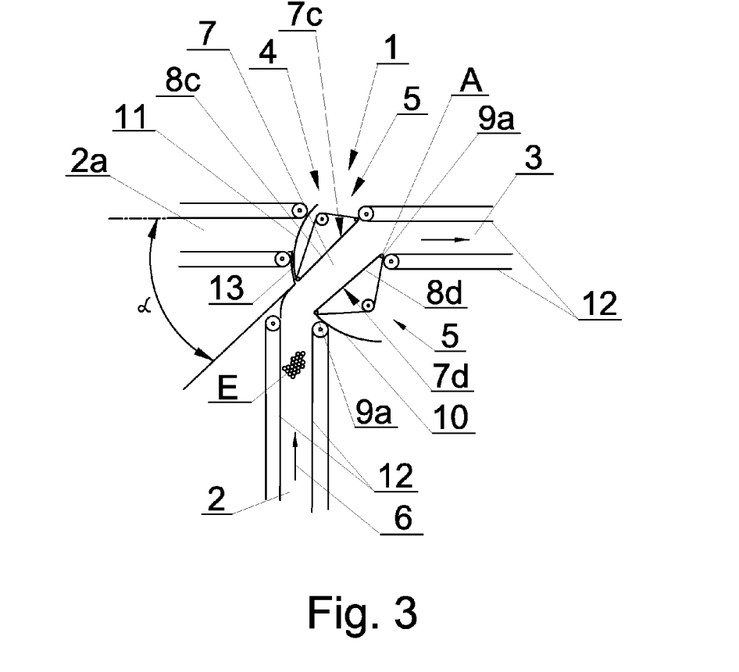
FIG. 3 shows a valve device in a second embodiment in the upward flow position; with two feeding conveying channels and one receiving conveying channel.

FIG. 3 shows the valve device 1 in the second embodiment with two feeding conveying channels 2 and 2a and one receiving conveying channel 3 where the rod-like articles flow from below from the vertical feeding conveying channel 2 upwards to the horizontal receiving conveying channel 3 via the through channel 7 of the rotatable change-over element 4. The axis of rotation A of the rotatable change-over element 4 is situated within the guiding element 9a in the exit area of the through channel 7 on the side of the receiving conveying channel 3. A clockwise rotation by a certain angle α of the rotatable change-over element 4 around its axis of rotation A will cause a shut-off of the flow in the feeding conveying channel 2 by the shut-off surface 10 of the rotatable change-over element 4, thus an opening of the horizontal flow to the receiving conveying channel 3 from the feeding conveying channel 2a by lifting the shut-off surface 11 of the rotatable change-over element 4. In the second embodiment, the conveying units 5 are designed as belt conveyors and are situated in such a way that their operating sections 8c, 8d 5 being the operating surfaces of the belts are parallel to each other constitute the walls 7c and 7d of the through channel 7. The conveyor belts are wound around rotatable or stationary supporting elements 9a.

Figure 4:
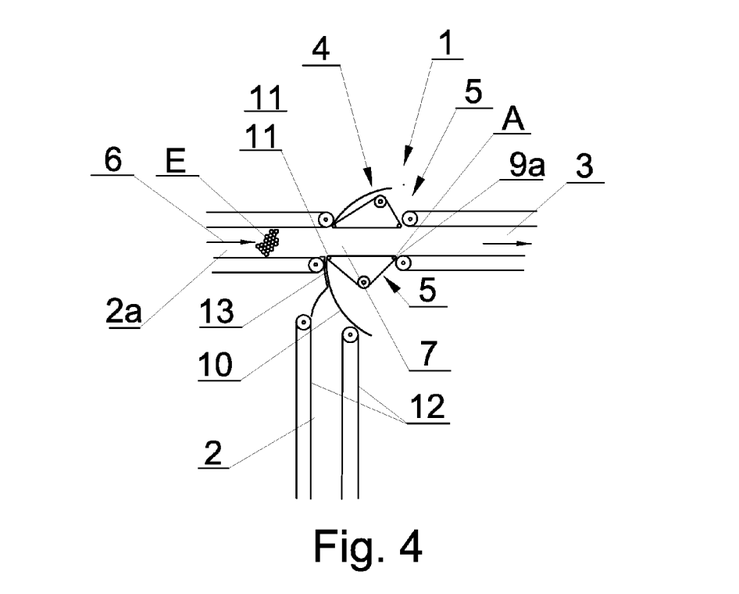
FIG. 4 shows the valve device of FIG. 3 in the flow position from the left feeding conveying channel to the right receiving conveying channel.

FIG. 4 shows the valve device 1 in the second embodiment with two feeding conveying channels 2 and 2a and one receiving conveying channel 3 in a flow position from the left feeding conveying channel 2a to the right receiving conveying channel 3 via the through channel 7 of the rotatable change-over element 4. The shut-off surface 10 of the rotatable change-over element 4 shuts off the flow from the feeding conveying channel 2 whereas at the same time the shut-off surface 11 of the rotatable change-over element 4 is situated outside of the flow from the feeding conveying channel 2a. An anticlockwise rotation of the rotatable change-over element 4 around the axis A, by the angle α, will cause a shut-off of the flow from the feeding conveying channel 2a with the shut-off surface 11 of the rotatable change-over element 4 and an opening of the flow from the feeding conveying channel 2 by lowering the shut-off surface 10 of the rotatable change-over element 4. During a change of position of the rotatable change-over element 4, the flow of rod-like articles from the channel 2a is stopped. The axis of rotation A of the rotatable change-over element 4 is situated within the guiding element 9a in the exit area of the through channel 7 on the side of the receiving conveying channel 3. After a change-over of the rotatable change-over element 4, the flow from the feeding channel 2 to the receiving channel 6 may be started.

Figure 5:
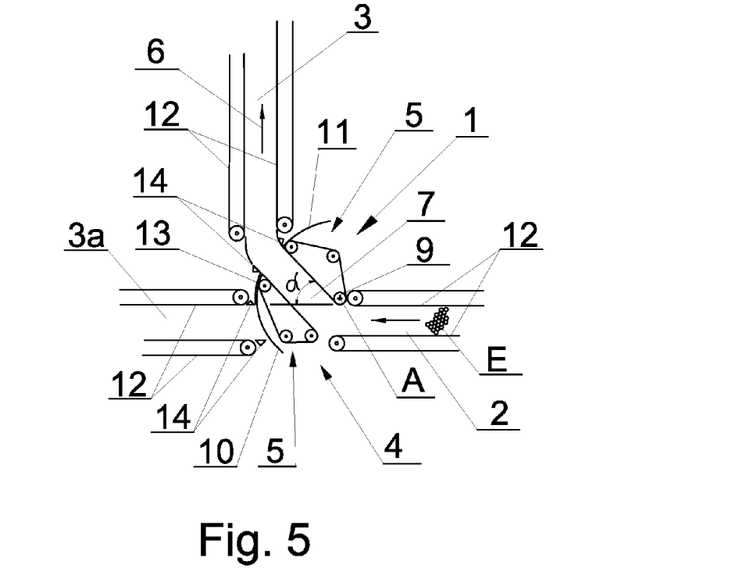
FIG. 5 shows a valve devices in a third embodiment in the upward flow position with one feeding conveying channel and two receiving conveying channels.
Figure 6:
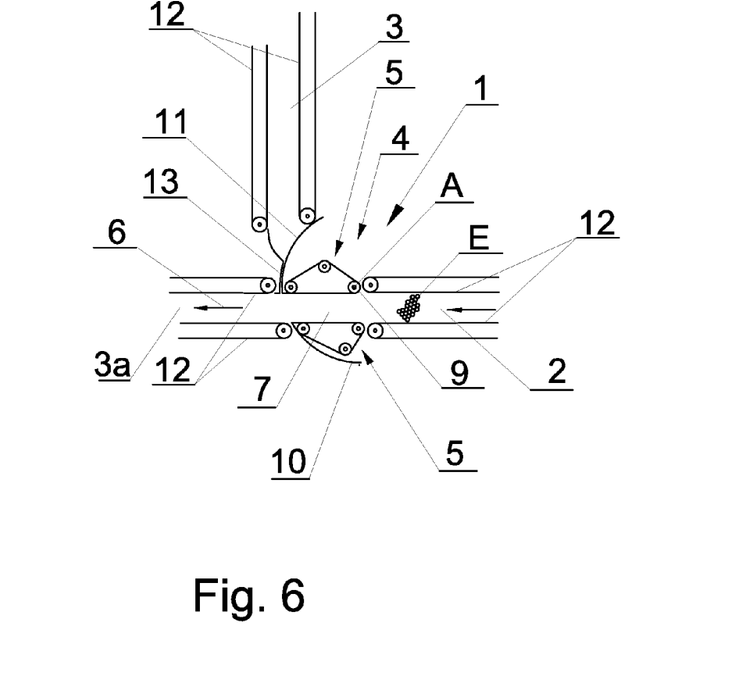
FIG. 6 shows the valve device of FIG. 5 in the horizontal flow position.

FIG. 5 shows a valve device 1 in the third embodiment with one feeding conveying channel 2 and two receiving conveying channels 3 and 3a. In this case, the mass flow of the rod-like articles E is delivered from the horizontal feeding conveying channel 2 via the through channel 7 of the rotatable change-over element 4 to the vertical receiving conveying channel 3. The valve device 1 is provided with pushing away devices 14 whose task is to prevent the jamming of the rod-like articles with the shut-off surfaces 10, 11 during the change in position of the rotatable change-over element 4. The change in position of the rotatable change-over element 4 by the angle α counterclockwise around its axis of rotation A, will cause a shut-off of the flow to the receiving conveying channel 3 with the shut-off surface 11 and a lowering of the shut-off surface 10 of the rotatable change-over element 4, thus an opening of the flow to the horizontal receiving conveying channel 3a. The mass flow of rod-like articles will then take place from the right side, horizontally to the left via the through channel 7 of the rotatable change-over element 4, which has been shown in FIG. 6.

Figure 5A:
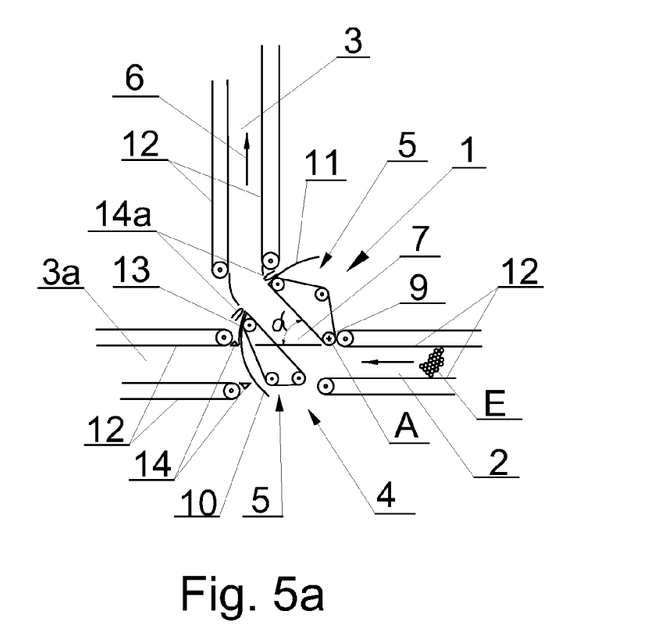
FIG. 5a shows the valve device of FIG. 5 in which the pushing away elements are compressed air nozzles.

FIG. 5a shows the valve device of FIG. 5 in which the pushing away elements are compressed air nozzles (14a).

Figure 5B:
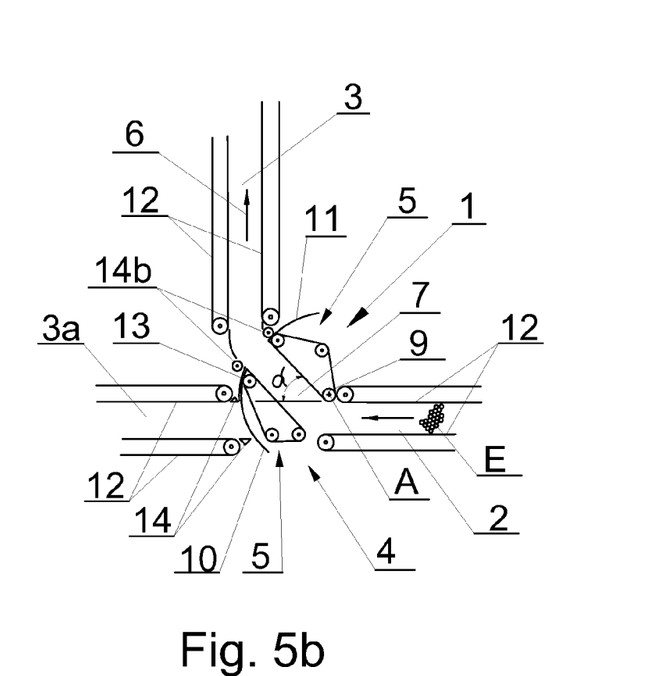
FIG. 5b shows the valve device of FIG. 5 in which the pushing away elements are pushing away rollers.

FIG. 5b shows the valve device of FIG. 5 in which the pushing away elements are pushing away rollers (14b).

Figure 7:
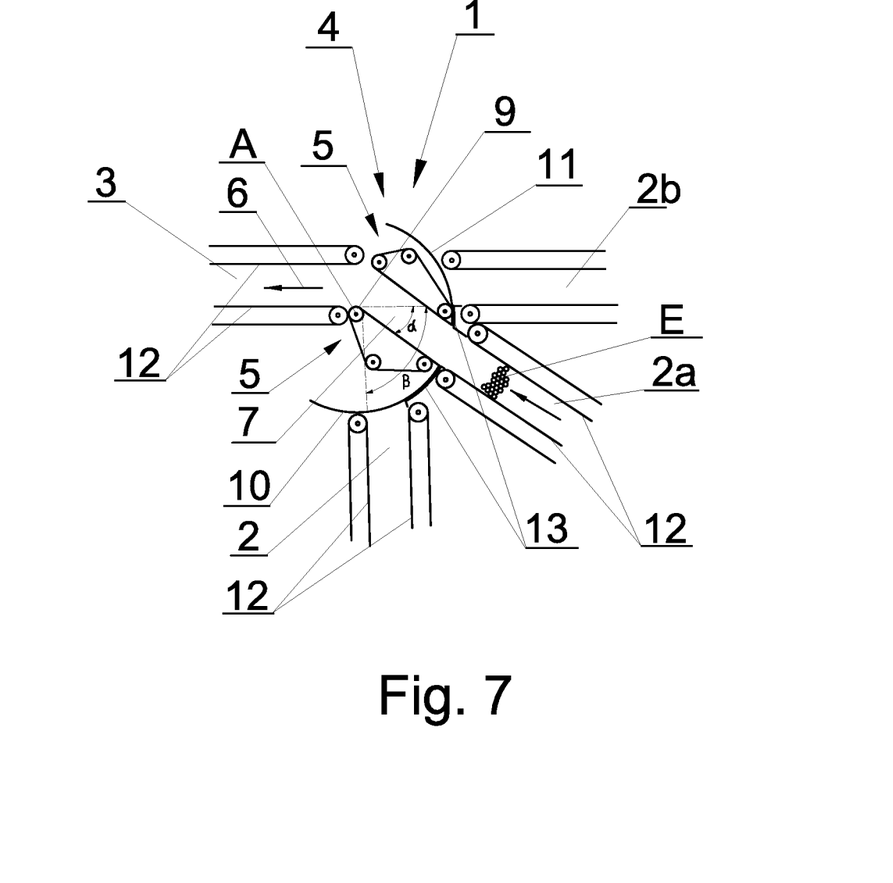
FIG. 7 shows the valve device in a fourth embodiment with three feeding channels and one receiving channel.

FIG. 7 shows a valve device 1 in the fourth embodiment. The valve device has three feeding conveying channels 2, 2a, 2b and one conveying channel 3 receiving the mass flow of the rod-like articles E. The rotatable change-over element 4 may be changed over among the angular positions so as to allow the flow from one of three feeding conveying channels 2, 2a, 2b to the receiving channel 3. In this embodiment, the shut-off surfaces 10 and 11 have such length that allows them to simultaneously shut-off the flow from two adjacent to each other feeding conveying channels. After a rotational movement of the rotatable change-over element 4 around its axis of rotation A, a change in its position relative to the feeding conveying channels 2, 2a and 2b and an opening of one of them takes place, with the remaining two being shut off. If the rotatable change-over element 4 is in a horizontal position, then the mass flow takes place from the feeding conveying channel 2b to the receiving channel 3 via the through channel 7 of the rotatable change-over element 4, and the flow from the feeding channels 2 and 2a is shut off with the shut-off surface 10. A change in angular position of the rotatable change-over element 4 around its axis A clockwise by the angle α will cause a shut-off of the flow from the feeding conveying channel 2b with the shut-off surface 11, a retention of shut-off of the flow from the feeding conveying channel 2 with the shut-off surface 10 and an opening of the flow from the feeding conveying channel 2a to the receiving conveying channel 3 as shown in the drawing. A change in angular position of the rotatable change-over element 4 around its axis A clockwise by the angle β from the horizontal position will cause a shut-off of the flow from the feeding conveying channels 2b and 2a with the shut-off surface 11 of the rotatable change-over element 4 and an opening of the flow from the feeding conveying channel 2 to the receiving channel 3 by withdrawing the shut-off surface 10. In this embodiment, the valve device 1 has two guiding surfaces 13 where the first of them is situated between the feeding conveying channels 2 and 2a and the second between the feeding conveying channels 2a and 2b.

The invention claimed is:

1. An apparatus comprising a valve device for changing over mass flow of rod-like articles of the tobacco industry, between at least two non-parallel conveying channels feeding rod-like articles and a conveying channel receiving rod-like articles or between a conveying channel feeding rod-like articles and at least two non-parallel conveying channels receiving rod-like articles, the valve device comprising:

at least one rotatable change-over element for changing over mass flow comprising a through channel for transferring mass flow between the feeding conveying channel and the receiving conveying channel, the rotatable change-over element having different angular positions relative to its principally horizontal axis of rotation which allow connecting individual feeding and receiving channels, in which in the rotatable change-over element (4) at least one conveying unit (5) situated at a wall (7a, 7b, 7c, 7d) of a through channel (7) of the rotatable change-over element (4) is disposed, the conveying unit (5) having an operating section (8a, 8b, 8c, 8d) supporting mass flow of rod-like articles (E) via the through channel (7) in the direction from a feeding channel (2, 2a, 2b) to a receiving channel (3, 3a).

2. The apparatus as in claim 1 characterised in that the rotatable change-over element (4) has at least one shut-off surface (10, 11) rotatable together with the through channel (7) for shutting-off a channel (2, 2a, 2b, 3, 3a) opening which is not connected with the through channel (7) of the change-over element (4).

3. The apparatus as in claim 1 characterised by being provided with a guiding surface (13) for rod-like articles (E) located in the through channel (7) of the change-over element (4) during the rotation of the rotatable change-over element (4).

4. The apparatus as in claim 1 characterised in that the conveying unit (5) comprises a conveying belt or chain and guiding elements (9, 9*a*) for guiding the conveying belt or chain situated at both ends of the operating section (8*a*, 8*b*, 8*c*, 8*d*) of the conveying unit (5).

5. The apparatus as in claim 4 characterised in that at least one wall (7*a*, 7*b*, 7*c*, 7*d*) of the through channel (7) is formed by the operating section (8*a*, 8*b*, 8*c*, 8*d*) of the conveying unit (5) and by at least one wall element (15, 16).

6. The apparatus as in claim 5 characterised in that the axis of rotation (A) of the rotatable change-over element (4) is situated within the guiding element (9, 9*a*) or the wall element (15, 16).

7. The apparatus as in claim 4 characterised in that at least one wall (7*a*, 7*b*) of the through channel (7) is formed entirely by the operating section (8*a*, 8*b*) of the conveying unit (5).

8. The apparatus as in claim 7 characterised in that the axis of rotation (A) of the rotatable change-over element (4) is situated within the guiding element (9*a*, 9*b*).

9. The apparatus as in claim 4 characterised in that the walls (7*a*) of the through channel (7, 7*b*, 7*c*, 7*d*) are essentially parallel to each other.

10. The apparatus as in claim 1 characterised in that the pushing away elements (14) for separating the rod-like articles (E) situated in the feeding channel (2, 2*a*, 2*b*) from the rod-like articles (E) situated in the rotatable change-over element (4) are disposed in between the feeding channel (2, 2*a*, 2*b*) and the rotatable change-over element (4).

11. The apparatus as in claim 10 characterised in that the pushing away elements (14) are compressed air nozzles (14*a*).

12. The apparatus as in claim 10 characterised in that the pushing away elements (14) are pushing away rollers (14*b*).

* * * * *